Patented Dec. 6, 1949

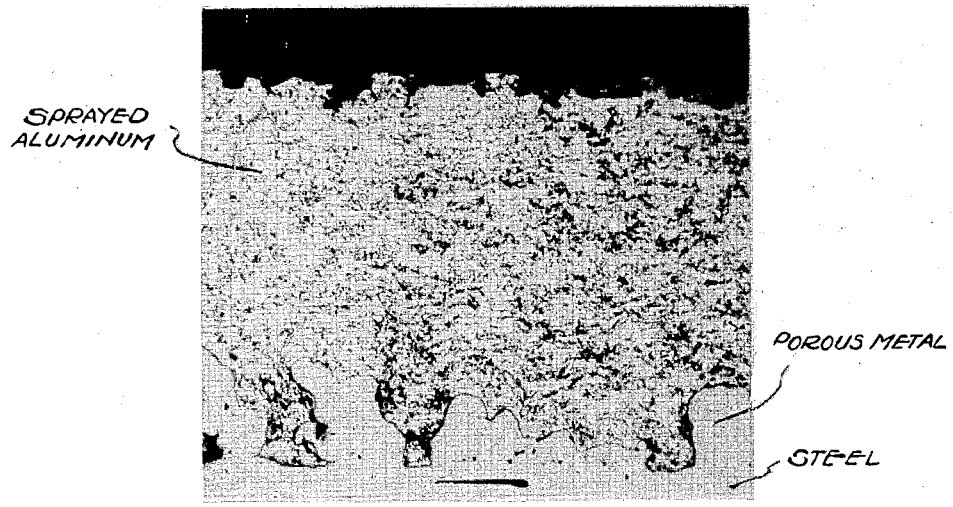
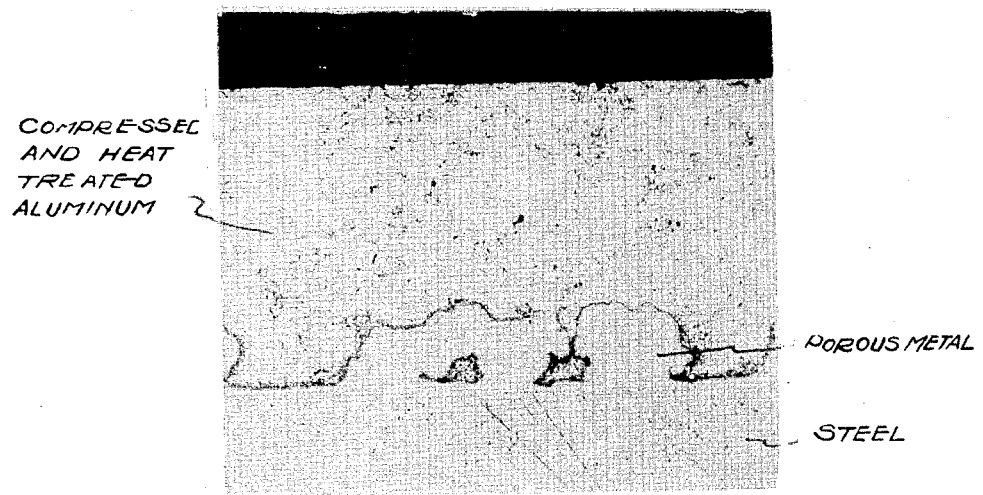

2,490,543

UNITED STATES PATENT OFFICE 2,490,543

METHOD OF MAKING COMPOSITE STOCK

John M. Robertson and Harold W. Schultz, Dayton, Ohio, assignors to General Motors Corporation, Detroit, Mich., a corporation of Delaware Application June 27, 1945, Serial No. 601,764

4 Claims. (Cl. 148—11.5)

This invention relates to friction or anti-friction elements, and to methods for making such elements and is particularly directed to a composite type of element wherein an aluminum surface is supported and carried by a strong metal backing member, such as steel or the like.

Aluminum has long been recognized as an excellent material for rubbing contact since it has very desirable frictional characteristics. This material is usually used in thin sections, and is preferably supported and/or bonded to a strong metal backing, such as steel.

In the past aluminum on steel elements have been made by bonding the aluminum directly onto a steel support. These elements for the most part, have not been satisfactory due to the brittle bonding layer formed intermediate the aluminum and the steel. This brittle bonding layer is caused by the diffusion between the iron and the aluminum at the bonding temperature which causes the formation of a thin layer of aluminum-iron alloy at the bond line which alloy is extremely brittle and causes failure of the bond due to fatigue or deformation. This brittle bonding layer is difficult to eliminate at normal bonding temperatures.

Our invention is directed to a composite aluminum on steel element which, due to its method of manufacture, does not have a brittle bonding layer between the aluminum and the steel since the aluminum is applied to the steel in such a manner as to preclude a brittle aluminum-iron alloy.

It is therefore an object of our invention to provide a composite element for use as a bearing, clutch, or other type of friction or anti-friction surface; wherein aluminum is bonded to steel through an intermediate porous metal layer which is bonded to the aluminum and also acts as a mechanical interlock between the aluminum and the steel.

In carrying out the above object, it is further object to provide a method for making a composite friction or anti-friction element wherein an aluminum layer is sprayed onto a porous metal layer which is metallurgically bonded to steel.

Further objects and advantages of the present invention will be apparent from the following description, reference being had to the accompanying drawings wherein preferred embodiments of the present invention are clearly shown.

In the drawings:

Fg. 1 is a photomicrograph at 100X showing a cross section of the material after spraying and before compression and Fig. 2 is a photomicrograph at 100X of the material in Figure 1 after a single compression and annealing step showing the homogenization of the sprayed aluminum layer.

In order to adequately bond aluminum to a steel backing material, we propose to use an intermediate layer of highly porous metal, such as, copper-nickel alloy, bonded metallurgically to the steel backing member. In place of a copper-nickel alloy, copper-iron, copper-tin or any other material which will form a satisfactory porous metal layer may be used. Specific details of various porous metal layers bonded to steel will be found in the Koehring Patent No. 2,198,253, assigned to the assignee of the present invention.

For illustrative purposes only the method used for forming a copper nickel layer on steel is set forth, wherein a mixture of copper and nickel powders in desired proportions (preferably 40% copper and 60% nickel) of suitable grain size, for example, from 50 to 325 mesh is spread in a uniform layer in the order of .015 to .030 of an inch thick on the flat steel strip of desired thickness. The strip with the copper nickel powder thereon is then sintered at a temperature of about 2000° F. for a period of approximately 5 to 30 minutes under non-oxidizing conditions, whereupon the copper and nickel alloy to form a substantially homogeneous alloy and simultaneously this alloy in the porous phase is metallurgical bonded to the surface of the steel. The steel with the porous metal layer thereon is next cooled under non-oxidizing conditions whereupon the strip is prepared for the overlay of aluminum or aluminum alloys which is sprayed onto the surface of the porous metal in a thickness of approximately .025 of an inch. The penetration of the aluminum into the matrix is dependent on the velocity of the spray and therefore very high velocity sprays are desirable. This layer is then compressed to a thickness of about .015 of an inch to aid in mechanically forcing the aluminum into the pores of the porous metal layer. After the aluminum layer is compressed it is heat treated to physically homogenize the aluminum into a substantially continuous and non-interrupted layer since after spraying, the aluminum is in a more or less lamellar condition. Furthermore this annealing relieves strains set up during the compression step. The heat treatment is carried out in a controlled atmosphere at a temperature of between 900 and 1000° F. and is preferably continued for 30 minutes. The layer is preferably again rolled to further reduce the thickness about ⅓ and in the preferred form to about .010 of an inch. The material is again heat treated at a similar temperature and for a similar time to that just described, namely 900 to 1,000° F., for about 30 minutes. The annealing temperature and time limits are the preferred range. Higher or lower temperatures, for example, 750° F. to 1150° F. may be used in inverse ratio to the time of treatment. In this connection the time of treatment should be sufficient to relieve strains and homogenize the aluminum layer without causing too great alloying thereof with the porous matrix.

The material is now ready for formation into bearings, clutches etc. This formation takes place in a conventional series of steps such as cutting the strip to the desired size, forming it to the desired shape, after which the material may or may not be re-annealed in accordance with the strains set up therein. If a re-annealing step is considered desirable as is the case where a cylindrical bearing is formed, the temperature should be below the above mentioned annealing temperatures, preferably between 700 or 800° F., for approximately 30 minutes. After formation and re-annealing, the aluminum layer is generally machined to the desired dimensions.

The spraying of metal referred to herein contemplates all types of metal spraying as for example, with a "Shoup" or "Schori" gun or by atomization of molten metal.

It is to be noted, that in the description herein set forth that when the aluminum is sprayed onto the porous metal, portions of the aluminum actually penetrate into the pores of the porous metal due to the ductility of the metal at the temperature of spraying. The impact of the particles tend to mushroom the particles within the pores which mushrooming effect is accentuated by the various compression steps described. Thus the aluminum layer is actually mechanically interlocked with the porous metal layer thereby forming a mechanical interlock therewith. No brittle aluminum-iron layer is present since the aluminum does not contact the iron as shown by the photomicrograph. The annealing step or steps form an alloy between the aluminum and the porous metal. The annealing also relieves strains in the aluminum layer and homogenizes the layer into a strong substantially continuous layer whereby a uniform layer is formed which is mechanically interlocked and bonded to a supporting member through the medium of a porous metal layer which is metallurgically bonded to the supporting member.

It is important to note that the porous metal layer prior to the application of the sprayed aluminum is preferably not sized or compressed in any way. It has been found that the porous metal layer must be open and porous in order to admit the aluminum. Obviously, in the compression or rolling steps after spraying, the porous metal layer, due to its ductility, is deformed to some extent which increases the interlock between the aluminum and the porous metal.

It is to be understood that satisfactory articles may be made by this process wherein the backing member is a metal other than iron, alloys thereof, steel etc., for example, nickel, bronze etc. Also metals other than aluminum may be sprayed such as copper, alloys thereof, babbitts, nickel alloys, silver, and in fact any metal which can be sprayed, if such metals form desirable surfaces. Temperatures of heat treatment of such metals are well known in the art.

We also contemplate a composite type of bearing having a composite bearing face similar to bearings disclosed in Boegehold's Patent 2,198,240. In this instance, the porous metal layer has portions thereof exposed through the aluminum to act as strong support points within the bearing, such material is made by machining the aluminum bearing layer until portions of the porous metal layer show through.

Obviously the extent of exposure can be controlled by the depth of machining. In this case, it is desirable to have the porous metal layer formed from a good bearing metal per se. This embodiment of the invention provides a strong bearing material at the exposed portion having bearing material of different frictional character such as, aluminum interposed between the exposed porous metal. Usually for most heavy duty work 10 to 60% exposure of the porous metal layer is satisfactory.

The use of substantially non-compacted sintered metal layers are not entirely necessary if sufficient porosity is maintained in the porous layer. Such porosity may be obtained by use of void forming compounds etc., in compacted metal powder and in this instance, porosities above 40% by volume are satisfactory.

It is to be understood that in many instances the compressing and annealing steps, after spraying, are unnecessary if the material is structurally sufficiently strong for the intended use. For this reason, our invention contemplates in the broadest sense the attachment of a sprayed metal layer to a strong metal backing through the medium of a porous metal layer and is not limited to manipulation of the sprayed metal layer after application.

While the embodiments of the present invention as herein disclosed, constitute preferred forms, it is to be understood that other forms might be adopted, all coming within the scope of the claims which follow.

What is claimed is as follows:

1. The method for forming a composite metal element for use as a friction or anti-friction surface, the steps comprising; providing a steel backing member having metallurgically bonded thereto a highly porous layer of sintered metal powder, spraying aluminum onto said porous metal layer in a layer of appreciable thickness, compressing said aluminum layer for forcing the same into the pores of the porous metal layer, annealing the element so formed at a temperature in the neighborhood of 900 to 1000° F. for a time sufficient to relieve strains in the aluminum layer, compressing the aluminum layer to reduce its thickness approximately one-third, and then re-annealing the element so formed at a temperature in the neighborhood of 900 to 1000° F. for a time sufficient to relieve strains in the aluminum layer.

2. In a method for forming a composite bearing element comprising an aluminum bearing surface supported on and carried by a strong steel backing member, the steps comprising; providing a strong steel backing member having a highly porous copper-nickel layer metallurgically bonded thereto, spraying aluminum onto said copper-nickel layer to a thickness of about .025 of an inch, compressing the aluminum layer to a thickness of about .015 of an inch, annealing the element so formed under suitable conditions of time and atmosphere at a temperature between 900 to 1000° F., for homogenizing the aluminum layer and relieving strains therein, compressing the aluminum layer to reduce its thickness by about one-third, re-annealing the article so formed under suitable conditions of time and atmosphere at a temperature between 900 to 1000° F., for homogenizing the aluminum layer.

3. In a method of forming a composite element for use as a friction or anti-friction surface the steps comprising; providing a strong steel backing member having a highly porous layer of sintered metal powder metallurgically bonded thereto, spraying a layer of metal onto said porous metal layer, compressing the layer so sprayed for forcing portions into the porous metal layer and then homogenizing the sprayed metal layer by annealing the element under suitable conditions of time, temperature and atmosphere for reducing the lamellar structure of the sprayed metal layer and relieving strains therein.

4. In a method for forming a composite metal element, the steps of; providing a strong metal backing having a sintered non-compacted metal layer bonded thereto, spraying aluminum onto said layer in a layer of appreciable thickness, rolling said aluminum layer for forcing same into pores of the porous metal layer, annealing the element so formed at a temperature below the melting point of the aluminum and above 750° F., for a time sufficient to relieve strains in the aluminum layer.

JOHN M. ROBERTSON.
HAROLD W. SCHULTZ.

REFERENCES CITED

The following references are of record in the file of this patent:

UNITED STATES PATENTS

| Number | Name | Date |
|---|---|---|
| 1,904,241 | Kammerer | Apr. 18, 1933 |
| 2,170,361 | Whitfield | Aug. 22, 1939 |
| 2,217,001 | Bockius | Oct. 8, 1940 |
| 2,241,095 | Marvin | May 6, 1941 |
| 2,320,327 | Meduna | May 25, 1943 |
| 2,388,694 | Kenne et al. | Nov. 13, 1945 |

FOREIGN PATENTS

| Number | Country | Date |
|---|---|---|
| 204,384 | Great Britain | Sept. 27, 1923 |
| 431,067 | Great Britain | July 1, 1935 |